US009071340B2

(12) United States Patent
Jos et al.

(10) Patent No.: US 9,071,340 B2
(45) Date of Patent: Jun. 30, 2015

(54) METHOD AND APPARATUS FOR GENERATING ORTHOGONAL CODES WITH WIDE RANGE OF SPREADING FACTOR

(71) Applicant: Samsung Electronics Co., Ltd., Suwon-si (KR)

(72) Inventors: Sujit Jos, Bangalore (IN); Jinesh P Nair, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/474,771

(22) Filed: Sep. 2, 2014

(65) Prior Publication Data

US 2015/0063424 A1 Mar. 5, 2015

(30) Foreign Application Priority Data

Sep. 2, 2013 (IN) .......................... 3924/CHE/2013
Feb. 17, 2014 (KR) ........................ 10-2014-0017985

(51) Int. Cl.
*H04B 1/00* (2006.01)
*H04B 1/69* (2011.01)
*H04L 7/00* (2006.01)

(52) U.S. Cl.
CPC ............... *H04B 1/69* (2013.01); *H04L 7/0091* (2013.01)

(58) Field of Classification Search
CPC ............................... H04B 1/69; H04L 7/0091
USPC ......................................................... 375/345
See application file for complete search history.

(56) References Cited

U.S. PATENT DOCUMENTS

| 6,012,023 A * | 1/2000 | Iijima et al. .................... 704/207 |
| 6,243,672 B1 * | 6/2001 | Iijima et al. .................... 704/207 |
| 2005/0019040 A1 | 1/2005 | Trutna, Jr. |
| 2006/0250942 A1 * | 11/2006 | van Nee ........................ 370/209 |
| 2009/0290566 A1 * | 11/2009 | Ito ................. 370/338 |
| 2010/0049470 A1 * | 2/2010 | Szajnowski ................... 702/159 |
| 2010/0309958 A1 * | 12/2010 | Lakkis .......... 375/146 |
| 2010/0309959 A1 * | 12/2010 | Lakkis .......... 375/150 |

FOREIGN PATENT DOCUMENTS

| EP | 1 257 077 A1 | 11/2002 |
| KR | 10-2002-0079982 A | 11/2002 |
| KR | 10-2002-0089079 A | 11/2002 |
| KR | 10-2005-0013611 A | 2/2005 |
| WO | WO 2004/057786 A1 | 7/2004 |

OTHER PUBLICATIONS

Jos, Sujit, et al. "Performance Comparison of Orthogonal and Quasi-orthogonal Codes in Quasi-Synchronous Cellular CDMA Communication." AccessNet. 2009., ICST Institute for Computer Science, Social-Informatics and Telecommunications Engineering 2009 pp. 78-88.

* cited by examiner

*Primary Examiner* — Erin File
(74) *Attorney, Agent, or Firm* — NSIP Law

(57) ABSTRACT

Provided is a method of generating an orthogonal set in a quasi-synchronous spread spectrum system, the method including selecting a two-level autocorrelation sequence at a sequence selector, selecting a first indices set and a second indices set from the two-level autocorrelation sequence, and generating two quasi-orthogonal sets using the first indices set and the second indices set, at an orthogonal code generator.

21 Claims, 3 Drawing Sheets

METHOD AND APPARATUS FOR GENERATING ORTHOGONAL CODES WITH WIDE RANGE OF SPREADING FACTOR

CROSS-REFERENCE TO RELATED APPLICATION(S)

This application claims the benefit under 35 USC 119(a) of Indian Patent Application No. 3924/CHE/2013, filed on Sep. 2, 2013, in the Office of the Controller General of Patents, Designs & Trade Marks and Korean Patent Application No. 10-2014-0017985, filed on Feb. 17, 2014, in the Korean Intellectual Property Office, the entire disclosures of which are incorporated herein by reference for all purposes.

BACKGROUND

1. Field

The following description relates to a field of orthogonal code generation and to technology for generating a pair of orthogonal code sets having a wide range of spreading factor for a quasi-synchronous spread spectrum application.

2. Description of Related Art

Orthogonal codes have become a significant for predetermined direct sequence spread spectrum-based communication system for communicating through a wireless channel. In general, at least one set of codes may be generated and provided to a spread spectrum-based communication system for assignment to a user. Here, each set may include codes that are orthogonal in practice. Orthogonality of the codes may allow different users to communicate using a same channel with the least multiple-access interference (MAI). In the spread spectrum-based communication system, a single orthogonal code or a plurality of orthogonal codes included in the at least one set may be assigned to a user in response to a request of the user. However, a total number of orthogonal codes included in a set deployed in a spread spectrum may be limited based on a processing gain or a spreading factor of the spread spectrum-based communication system.

When thorough synchronization is maintained, orthogonal codes may be used for spreading user data. In practice, however, thorough synchronization may not be assured due to an effect of a non-linear channel and a diversified geographical distribution of users. A current communication system may restrict synchronous errors to a few chips. The synchronous errors may be reduced based on an advancement of silicon technology and signal processing algorithms.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of generating an orthogonal set in a quasi-synchronous spread spectrum system, the method including selecting a two-level autocorrelation sequence, at a sequence selector, selecting a first indices set and a second indices set from the two-level autocorrelation sequence, and generating two quasi-orthogonal sets using the first indices set and the second indices set, at an orthogonal code generator, wherein the two-level autocorrelation sequence comprises at least one of an element −1 and an element 1.

The selecting of the two-level autocorrelation sequence may include selecting the two-level autocorrelation sequence of a period N−1, where N is a spreading factor, and the two-level autocorrelation sequence may include the element −1 and the element 1.

The selecting of the first indices set and the second indices set may include selecting the first indices set by obtaining indices of all elements 1 of the two-level autocorrelation sequence, and ignoring, in the first indices set, indices corresponding to consecutive elements 1 of the two-level autocorrelation sequence.

The selecting of the first indices set and the second indices set may include selecting the second indices set by obtaining indices of all elements −1 of the two-level autocorrelation sequence, and ignoring, in the second indices set, indices corresponding to consecutive elements −1 of the two-level autocorrelation sequence.

The two quasi-orthogonal sets may include a first quasi-orthogonal set and a second quasi-orthogonal set.

The method may include obtaining the first quasi-orthogonal set by circularly reading the two-level autocorrelation sequence, starting from a position corresponding to an index of the element 1 to one of a left-hand side and a right-hand side, wherein the first quasi-orthogonal set is obtained in a first matrix where a row is obtained by circularly reading the two-level autocorrelation sequence.

The method may include obtaining the second quasi-orthogonal set by circularly reading the two-level autocorrelation sequence, starting from a position corresponding to an index of the element −1 to one of the left-hand side and the right-hand side, wherein the second quasi-orthogonal set is obtained in a second matrix where a row is obtained by circularly reading the two-level autocorrelation sequence.

The method may include obtaining two sets of orthogonal codes from the first quasi-orthogonal set and the second quasi-orthogonal sets, wherein the two sets of the orthogonal codes comprises a first orthogonal set and a second orthogonal set.

The first orthogonal set may be obtained by appending a column of all elements 1 of the first matrix.

The second orthogonal set is obtained by appending a column of all elements −1 of the second matrix.

In another general aspect, there is provided an apparatus for generating two sets of orthogonal codes of a spreading factor N in a quasi-synchronous spread spectrum system, the apparatus including a sequence selector configured to select a two-level autocorrelation sequence, an index selector configured to select a first indices set and a second indices set from the two-level autocorrelation sequence, and an orthogonal code generator configured to generate two quasi-orthogonal sets using the first indices set and the second indices set, wherein the two-level autocorrelation sequence comprises at least one of an element −1 and an element 1.

The sequence selector may be configured to select a two-level autocorrelation sequence of a period N−1, where N is a spreading factor, and the two-level autocorrelation sequence comprises an element 1 and an element −1.

The index selector may be further configured to select the first indices set by obtaining indices of all elements 1 of the two-level autocorrelation sequence, and to ignore, in the first indices set, indices corresponding to consecutive elements 1 of the two-level autocorrelation sequence.

The index selector may be further configured to select the second indices set by obtaining indices of all elements −1 of the two-level autocorrelation sequence, and to ignore, in the second indices set, indices corresponding to consecutive elements −1 of the two-level autocorrelation sequence.

The two quasi-orthogonal sets may include a first quasi-orthogonal set and a second quasi-orthogonal set.

The orthogonal code generator may be further configured to obtain the first quasi-orthogonal set by circularly reading the two-level autocorrelation sequence, starting from a position corresponding to an index of the element 1 to one of the left-hand side and the right-hand side, and the first quasi-orthogonal set is obtained in a first matrix where a row is obtained by circularly reading the two-level autocorrelation sequence.

The orthogonal code generator may be further configured to obtain the second quasi-orthogonal set by circularly reading the two-level autocorrelation sequence, starting from a position corresponding to an index of the element −1 to one of the left-hand side and the right-hand side, and the second quasi-orthogonal set is obtained in a second matrix where a row is obtained by circularly reading the two-level autocorrelation sequence.

The orthogonal code generator may be further configured to obtain two sets of orthogonal codes from the first quasi-orthogonal set and the second quasi-orthogonal sets, and the two sets of the orthogonal codes comprise a first orthogonal set and a second orthogonal set.

The first orthogonal set may be obtained by appending a column of all elements 1 of the first matrix.

In another general aspect, there is provided a method of generating two sets of orthogonal codes of a spreading factor N in a quasi-synchronous spread spectrum system, the method including selecting a two-level autocorrelation sequence, at a sequence selector, selecting a first indices set and a second indices set from the two-level autocorrelation sequence, generating a first quasi-orthogonal set, at an orthogonal code generator, by circularly reading the two-level autocorrelation sequence, starting from a position corresponding to an index of an element 1 to one of a left-hand side and a right-hand side, generating a second quasi-orthogonal set, at an orthogonal code generator, by circularly reading the two-level autocorrelation sequence, starting from a position corresponding to an index of an element −1 to one of the left-hand side and the right-hand side, and obtaining two sets of orthogonal codes from the first quasi-orthogonal set and the second quasi-orthogonal sets.

In another general aspect, there is provided a method of generating two orthogonal code sets, each including a wide range of spreading factors equal to approximately one-third of the spreading factors.

In another general aspect, there is provided generated orthogonal sets having An autocorrelation side lobe of a predetermined codeword in a predetermined set may be "0" with respect to a time shift of ±1 chips, and a cross correlation between predetermined two codes included in a set may be "0" with respect to times shift of ±1 chips including "0".

In another general aspect, there is provided a method of generating an orthogonal set in a quasi-synchronous spread spectrum system, the method including Other features and aspects will be apparent from the following detailed description, the drawings, and the claims.

Figure 1:
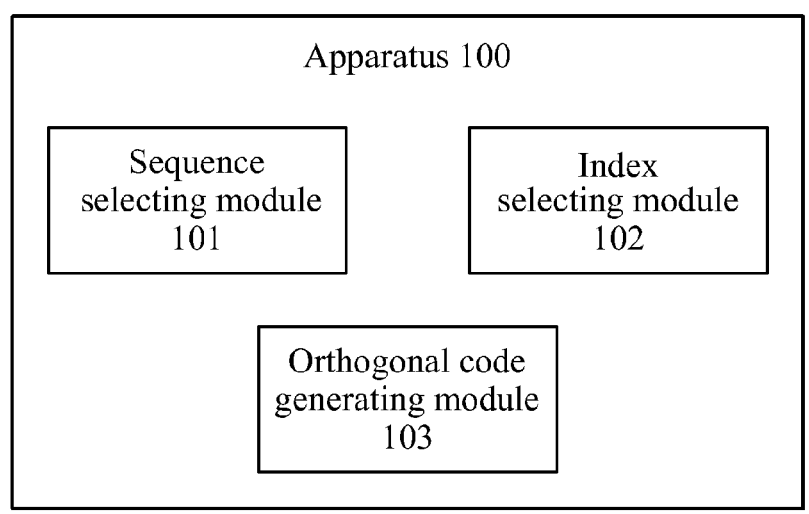
FIG. 1 is a diagram illustrating an example of an apparatus including various modules.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In an example, a method and apparatus for generating a pair of orthogonal code sets having a wide range of spreading factors for a quasi-synchronous spread spectrum is provided, and reception may be synchronized in a single chip. A number of codes included in each generated set may be equal to approximately one-third of spreading factors.

As shown in FIG. 1, the apparatus 100 includes a sequence selecting module 101, an index selecting module 102, and an orthogonal code generating module 103. The sequence selecting module 101 may select a two-level autocorrelation sequence in a period p=N−1 with elements from a set {1, −1}. The index selecting module 102 may select at least one index from the two-level autocorrelation sequence. The orthogonal code generating module 103 may generate two sets of orthogonal codes, each of the two sets including an approximately N/3 sequences. Here, N is a spreading factor of a code.

In an example, the apparatus 100 may be, for example, a stand-alone chip, an integrated circuit (IC), a silicon on chip (SoC), or a hardware including a processor and a memory coupled to the processor. A memory may include the orthogonal code generating module 103. The orthogonal code generating module 103 may generate two orthogonal codes. Each of the two sets of the orthogonal codes may include N orthogonal codes of N period. N may be a spreading factor of a communication system based on a direct sequence spread spectrum.

In a method according to an example, two sets of approximately N/3 orthogonal codes of a spreading factor N initiating with the two-level autocorrelation sequence of the period P=N−1 may be generated. The two sets of the orthogonal codes may be generated in consideration of conditions described below.

An autocorrelation side lobe of a predetermined codeword included in a predetermined set of the two sets may be "0" with respect to a time shift of a ±1 chip.

A cross-correlation between two predetermined codes included in the set may be "0" with respect to the time shift of the ±1 chip including "0".

Hereinafter, some terms used in the following description will be explained.

Cross-correlation: A cross-correlation may indicate a similarity between two different signals. A cross-correlation function may be periodical or aperiodical. A mathematical relationship of a periodical cross-correlation in a delay τ between two binary sequences $c_k$ and $c_j$ having elements of the set {1, −1} may be shown in Equation 1.

$$R_{k,j}(\tau) = \sum_{n=0}^{N-1} c_k(n) c_j(n+\tau)$$ [Equation 1]

Two-level autocorrelation sequence: R(k) denotes a periodical correlation in a delay k. A binary sequence may satisfy a property of Equation 2.

$$R(k) = \begin{cases} N & \text{if } k = 0 \\ -1 & \text{if } 0 < k < N \end{cases}$$ [Equation 2]

The two-level autocorrelation sequence may be defined as described above.

Left shift operation: $a_i$ denotes a binary sequence given as $a_i = a_0, a_1, a_2, \ldots$. Thus, a left shift operation performed by g on the binary sequence may result in $a_{i+g}$ as given by $a_{i+g} = L^g(a_i) = a_g, a_{g+1}, a_{g+2}, \ldots$. An operator $L^g$ may be called a left shift by a g operator.

Quasi-orthogonal code set: $A_p = \{a_0, a_1, a_2, \ldots, a_{p-2}, a_{p-1}\}$ may be a binary set including P binary sequences. Each period P may be arranged to allow a sequence $a_i$ to indicate an $i^{th}$ row of a matrix $A_p$. When the binary sequences $a_j$ and $a_k$ are elements of the set $A_p$ and a correlation $R_{i,j}$ is "−1", the set $A_p$ may be called a quasi-orthogonal set of an order P.

Figure 2:
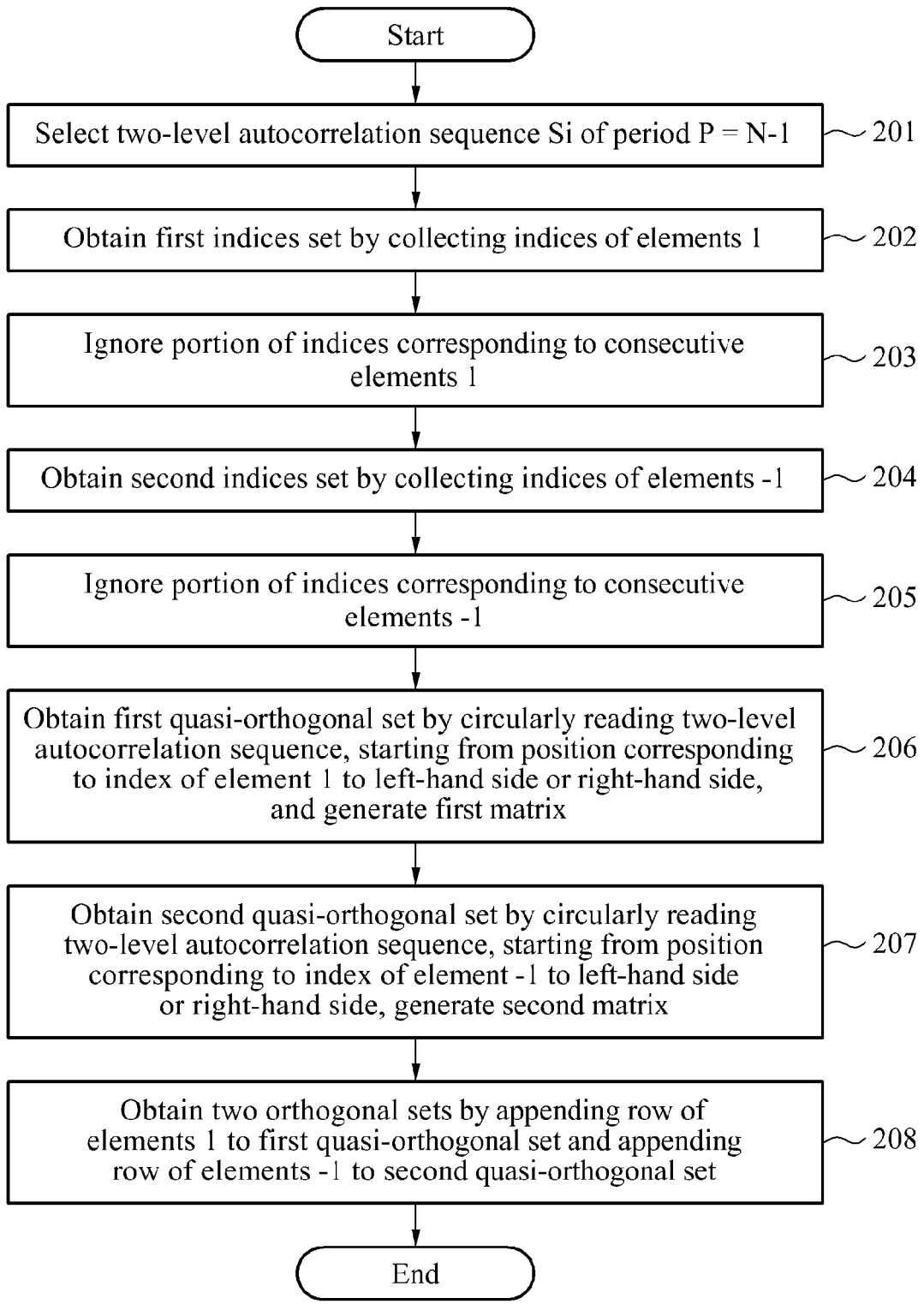
FIG. 2 is a diagram illustrating an example of a process of generating two codes.

FIG. 2 is a diagram illustrating an example of a method of generating two codes. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. The above descriptions of FIG. 1 is also applicable to FIG. 2, and are incorporated herein by reference. Thus, the above description may not be repeated here.

In the method, a pair of orthogonal sets may be generated for a predetermined processing gain, for example, a spreading factor, and each set may be determined to be an interference-free window (IFW) of ±1. The generated orthogonal sets may be determined to be the spreading factor for estimating a predetermined value of N for which a two-level autocorrelation sequence of a period N−1 exists. Referring to FIG. 2, in 201, a two-level autocorrelation sequence $S_i$ of a period P=N−1 is selected. In this example, the two-level autocorrelation sequence may be determined to be an unnormalized periodical correlation value of which a phase of the element −1 is different.

In 202, a first indices set, for example, a set A, is obtained by collecting indices of all elements 1 included in the two-level autocorrelation sequence $S_i$. In 203, a portion of indices corresponding to consecutive elements 1 in the two-level autocorrelation sequence $S_i$ is ignored.

In 204, a second indices set, for example, a set B is obtained by collecting indices of all elements −1 included in the two-level autocorrelation sequence $S_i$. In 205, a portion of indices corresponding to consecutive elements −1 in the two-level autocorrelation sequence $S_i$ is ignored.

In an example, two quasi-orthogonal sets may be generated based on the first indices set and the second indices set. The two quasi-orthogonal sets may include a first quasi-orthogonal set and a second quasi-orthogonal set.

In 206, a first quasi-orthogonal set $S^1_k$ is obtained by circularly reading the two-level autocorrelation sequence $S_i$, starting from a position corresponding to an index of the element 1 to a left-hand side or a right-hand side, thereby generating a first matrix including a row and a column as shown in Equation 3. In this example, rows of the first matrix may include sequences obtained by circularly reading the two-level autocorrelation sequence $S_i$.

$$S_k^1 = \{L^k(s_i) \forall k \in A\}$$ [Equation 3]

In 207, a second quasi-orthogonal set $S^2_k$ is obtained by circularly reading the two-level autocorrelation sequence $S_i$, starting from a position corresponding to an index of the element −1 to the left-hand side or the right-hand side, thereby generating a second matrix including a row and a column as shown in Equation 4. In this example, rows of the second matrix may include sequences obtained by circularly reading the two-level autocorrelation sequence $S_i$.

$$S_k^2 = \{L^k(s_i) \forall k \in B\}$$ [Equation 4]

A set $\{S^t_k\}$ and a set t∈{1,2} may be configured with approximately P/3 sequences of a period of P=N−1. Here, N may be a targeted spreading factor of an orthogonal sequence to be designed subsequently.

In an example, each of the set $\{S^t_k\}$ and the set t∈{1,2} may be converted to obtain two orthogonal sets. The two orthogonal sets may include a first orthogonal set and a second orthogonal set. In 208, the first orthogonal set is obtained by appending a row of all elements 1 to the first quasi-orthogonal set $S^1_k$ of the first matrix, and the second orthogonal set is obtained by appending a row of all elements −1 of to the second quasi-orthogonal set $S^1_k$ of the second matrix. For example, two orthogonal sets of which IFWs of the element 1, for example, codes are orthogonal to a lag 0 and a lag ±1, and autocorrelation side lobes are 0 with respect to the lag ±1.

An advantage of such codes may be applicability to a spread spectrum system, and a synchronization error of the system may be limited to a single chip. Since the foregoing method may be implemented when the two-level autocorrelation sequence of a period N−1 exists for a predetermined spreading factor N, the process may encompass a wide range of a spreading factor.

Figure 3:
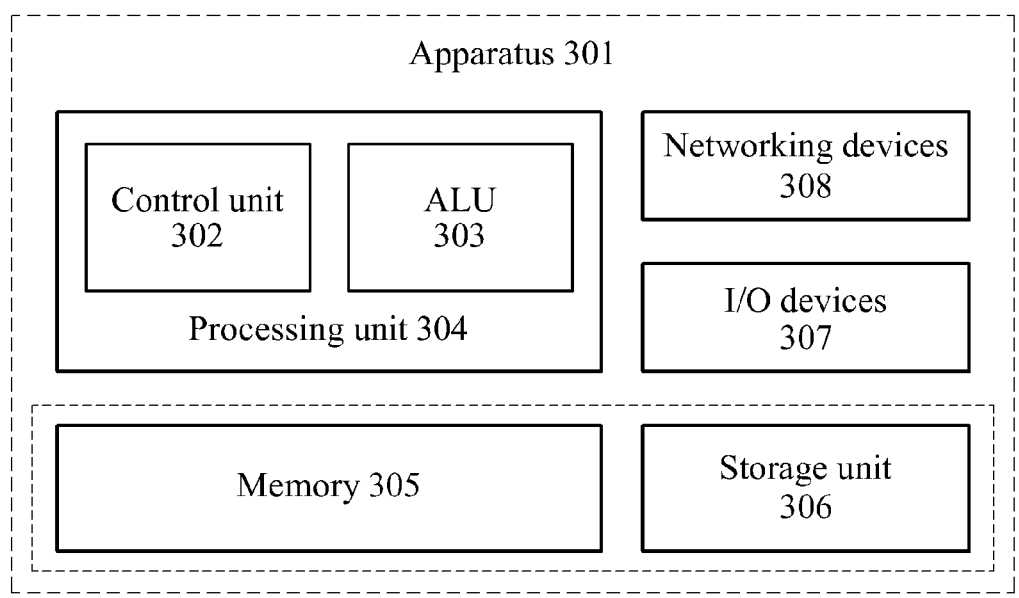
FIG. 3 is a diagram illustrating an example of an apparatus of generating two sets of orthogonal codes.

FIG. 3 will be further explained with an example described below. For example, the two-level autocorrelation sequence $S_i$ may be given as shown in Equation 5.

$$S_i = \{1, 1, 1, -1, -1, 1, -1\}$$ [Equation 5]

In the method, a first indices set, for example, a set A and a second indices set, for example, a set B may be obtained as shown in Equations 6 and 7.

Set A={1, 2, 3, 6} [Equation 6]

Set B={4, 5, 7} [Equation 7]

When the element 1 or the element −1 is consecutively provided in the two-level autocorrelation sequence $S_i$, a portion of indices corresponding to consecutive sequences may be ignored. For example, three elements 1 may be consecutively provided in a front portion of the two-level autocorrelation sequence $S_i$ of Equation 5. Among the three elements 1, an index of "2" corresponding to a second element 1 may be ignored in the first indices set of Equation 6. Also, the element −1 may be consecutively provided as a fourth element and a fifth element of the two-level autocorrelation sequence $S_i$ of Equation 5. Between the two elements, an index of "5" corresponding to the fifth element −1 may be ignored in the second indices set of Equation 7. Through this, a set A and a set B may be obtained as shown in Equations 8 and 9.

$$\text{Set } A = \{1, 3, 6\} \quad \text{[Equation 8]}$$

$$\text{Set } B = \{4, 7\} \quad \text{[Equation 9]}$$

A first quasi-orthogonal set may be obtained by circularly reading the set A, starting from a position corresponding to indices of the elements 1 and thus, a first matrix may be generated as shown in Equation 10.

$$\begin{matrix} 1 & 1 & 1 & -1 & -1 & 1 & -1 \\ 1 & -1 & -1 & 1 & -1 & 1 & 1 \\ 1 & -1 & 1 & 1 & 1 & -1 & -1 \end{matrix} \quad \text{[Equation 10]}$$

A second quasi-orthogonal set may be obtained by circularly reading the set B, starting from a position corresponding to indices of the elements −1 and thus, a second matrix may be generated as shown in Equation 11.

$$\begin{matrix} -1 & -1 & 1 & -1 & 1 & 1 & 1 \\ -1 & 1 & 1 & 1 & -1 & -1 & 1 \end{matrix} \quad \text{[Equation 11]}$$

The two quasi-orthogonal sets may be converted into two orthogonal sets by appending a column of the elements 1 in the first matrix of Equation 10 and a column of the elements −1 in the second matrix of Equation 11.

FIG. 3 is a diagram illustrating an example of an apparatus 301 for generating two sets of orthogonal codes. The apparatus 301 may include at least one processing unit 304, and the processing unit 304 may include a control unit 302 and an arithmetic logic unit (ALU) 303. The apparatus 301 may include a memory 305, a storage unit 306, a plurality of input/output (I/O) devices 307, and a plurality of networking devices 308. The processing unit 304 may process a command of an algorithm. The processing unit 304 may receive a command from the control unit 302 to perform processing. Also, an operation of an arithmetic and logic related to an execution of the command may be computed using the ALU 303.

The apparatus 301 may be configured with homogeneous and heterogeneous multi-cores, different types of multiple central processing units (CPUs), a special media, and accelerators. The processing unit 304 may be in charge of processing the command of the algorithm. The processing unit 304 may be disposed in a single chip or a plurality of chips.

An algorithm including a command and a code for use in an implementation may be stored in either the memory 305 or the storage unit 306, or both. Commands may be fetched from the memory 304 and/or the storage unit 306 to be processed by the processing unit 304.

In a case of implementing hardware, the I/O devices 307 or the networking devices 308 provided in various forms may be connected to the apparatus 301 to support implementation using a networking device and an I/O device.

Examples disclosed herein may be performed by at least one hardware device, and implemented through execution of at least one software program performing a network management function of controlling elements. The elements shown in FIGS. 1 and 3 may be at least one hardware device, or a combination of a hardware device and a software module.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, Wi-Fi, etc.). In addition, functional programs, codes, and code segments for accomplishing the example disclosed herein can be construed by programmers skilled in the art based on the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of apparatus comprising at least one processor for generating an orthogonal codeset in a quasi-synchronous spread spectrum communication system, the method comprising:
    selecting, by a sequence selector, a two-level autocorrelation sequence;
    selecting, by an index selector, a first indices set and a second indices set from the two-level autocorrelation sequence; and
    generating, by an orthogonal code generator, two quasi-orthogonal codesets using the first indices set and the second indices set,
    wherein the two-level autocorrelation sequence comprises at least one of an element −1 and an element 1.

2. The method of claim 1, wherein the selecting of the two-level autocorrelation sequence comprises selecting the two-level autocorrelation sequence of a period N−1, where N is a spreading factor, and
    the two-level autocorrelation sequence comprises the element −1 and the element 1.

3. The method of claim 2, wherein the selecting of the first indices set and the second indices set comprises selecting the first indices set by obtaining indices of all elements 1 of the two-level autocorrelation sequence, and
    ignoring, in the first indices set, indices corresponding to consecutive elements 1 of the two-level autocorrelation sequence.

4. The method of claim 2, wherein the selecting of the first indices set and the second indices set comprises selecting the second indices set by obtaining indices of all elements −1 of the two-level autocorrelation sequence, and
    ignoring, in the second indices set, indices corresponding to consecutive elements −1 of the two-level autocorrelation sequence.

5. The method of claim 1, wherein the two quasi-orthogonal codesets comprise a first quasi-orthogonal codeset and a second quasi-orthogonal codeset.

6. The method of claim 5, further comprising:
    obtaining, by the orthogonal code generator, the first quasi-orthogonal codeset by circularly reading the two-level autocorrelation sequence, starting from a position corresponding to an index of the element 1 to one of a left-hand side and a right-hand side,
    wherein the first quasi-orthogonal codeset is obtained in a first matrix where a row is obtained by circularly reading the two-level autocorrelation sequence.

7. The method of claim 6, further comprising:
    obtaining, by the orthogonal code generator, the second quasi-orthogonal codeset by circularly reading the two-level autocorrelation sequence, starting from a position corresponding to an index of the element −1 to one of the left-hand side and the right-hand side,
    wherein the second quasi-orthogonal codeset is obtained in a second matrix where a row is obtained by circularly reading the two-level autocorrelation sequence.

8. The method of claim 7, further comprising:
    obtaining, by the orthogonal code generator, two sets of orthogonal codes from the first quasi-orthogonal codeset and the second quasi-orthogonal codeset,
    wherein the two sets of the orthogonal codes comprise a first orthogonal codeset and a second orthogonal codeset.

9. The method of claim 8, wherein the first orthogonal codeset is obtained by appending a column of all elements 1 of the first matrix.

10. The method of claim 8, wherein the second orthogonal codeset is obtained by appending a column of all elements −1 of the second matrix.

11. An apparatus for generating two sets of orthogonal codes of a spreading factor N in a quasi-synchronous spread spectrum system, the apparatus comprising:
    a sequence selector configured to select a two-level autocorrelation sequence;
    an index selector configured to select a first indices set and a second indices set from the two-level autocorrelation sequence; and
    an orthogonal code generator configured to generate two quasi-orthogonal codesets using the first indices set and the second indices set,
    wherein the two-level autocorrelation sequence comprises at least one of an element −1 and an element 1.

12. The apparatus of claim 11, wherein the sequence selector is configured to select a two-level autocorrelation sequence of a period N−1, where N is a spreading factor, and
    the two-level autocorrelation sequence comprises an element 1 and an element −1.

13. The apparatus of claim 12, wherein the index selector is further configured to select the first indices set by obtaining indices of all elements 1 of the two-level autocorrelation sequence, and to ignore, in the first indices set, indices corresponding to consecutive elements 1 of the two-level autocorrelation sequence.

14. The apparatus of claim 12, wherein the index selector is further configured to select the second indices set by obtaining indices of all elements −1 of the two-level autocorrelation sequence, and to ignore, in the second indices set, indices corresponding to consecutive elements −1 of the two-level autocorrelation sequence.

15. The apparatus of claim 11, wherein the two quasi-orthogonal codesets comprise a first quasi-orthogonal codeset and a second quasi-orthogonal codeset.

16. The apparatus of claim 15, wherein the orthogonal code generator is further configured to obtain the first quasi-orthogonal codeset by circularly reading the two-level autocorrelation sequence, starting from a position corresponding to an index of the element 1 to one of the left-hand side and the right-hand side, and the first quasi-orthogonal codeset is obtained in a first matrix where a row is obtained by circularly reading the two-level autocorrelation sequence.

17. The apparatus of claim 16, wherein the orthogonal code generator is further configured to obtain the second quasi-orthogonal codeset by circularly reading the two-level autocorrelation sequence, starting from a position corresponding to an index of the element −1 to one of the left-hand side and the right-hand side, and the second quasi-orthogonal codeset is obtained in a second matrix where a row is obtained by circularly reading the two-level autocorrelation sequence.

18. The apparatus of claim 17, wherein the orthogonal code generator is further configured to obtain two sets of orthogonal codes from the first quasi-orthogonal codeset and the second quasi-orthogonal codeset, and the two sets of the orthogonal codes comprise a first orthogonal codeset and a second orthogonal codeset.

19. The apparatus of claim 18, wherein the first orthogonal codeset is obtained by appending a column of all elements 1 of the first matrix.

20. A method of apparatus comprising at least one processor for generating two sets of orthogonal codes of a spreading factor N in a quasi-synchronous spread spectrum communication system, the method comprising:

selecting, by a sequence selector, a two-level autocorrelation sequence;

selecting, by an index selector, a first indices set and a second indices set from the two-level autocorrelation sequence;

generating, by an orthogonal code generator, a first quasi-orthogonal codeset by circularly reading the two-level autocorrelation sequence, starting from a position corresponding to an index of an element 1 to one of a left-hand side and a right-hand side;

generating, by the orthogonal code generator, a second quasi-orthogonal codeset by circularly reading the two-level autocorrelation sequence, starting from a position corresponding to an index of an element −1 to one of the left-hand side and the right-hand side; and obtaining, by the orthogonal code generator, two sets of orthogonal codes from the first quasi-orthogonal codeset and the second quasi-orthogonal codeset.

21. The method of claim 20 further comprising:

selectively assigning the two sets of orthogonal codes respectively to a plurality of users; and the plurality of users respectively employing the two sets of orthogonal codes for communication using a shared communication channel with reduced multiple-access interference.

* * * * *